i
US010427026B1

(12) United States Patent
Smith

(10) Patent No.: US 10,427,026 B1
(45) Date of Patent: Oct. 1, 2019

(54) LONGBOARD-SKATEBOARD AND LONGBOARD-SKATEBOARD CONVERSION KIT

(71) Applicant: Roberto Alegre Smith, Hawthorne, CA (US)

(72) Inventor: Roberto Alegre Smith, Hawthorne, CA (US)

(*) Notice: Subject to any disclaimer, the term of this patent is extended or adjusted under 35 U.S.C. 154(b) by 0 days.

(21) Appl. No.: 15/648,583

(22) Filed: Jul. 13, 2017

Related U.S. Application Data

(60) Provisional application No. 62/363,304, filed on Jul. 17, 2016.

(51) Int. Cl.
| *A63C 5/07* | (2006.01) |
| *A63C 17/00* | (2006.01) |
| *A63C 17/01* | (2006.01) |
| *B29C 70/02* | (2006.01) |
| *A63C 5/06* | (2006.01) |

(52) U.S. Cl.
CPC ........... *A63C 17/0006* (2013.01); *A63C 5/07* (2013.01); *A63C 17/0046* (2013.01); *A63C 17/012* (2013.01); *A63C 17/017* (2013.01); *B29C 70/02* (2013.01); *A63C 2005/063* (2013.01)

(58) Field of Classification Search
CPC ..... A63C 17/01; A63C 17/012; A63C 17/014; A63C 17/015; A63C 2203/06; A63C 2203/42
See application file for complete search history.

(56) References Cited

U.S. PATENT DOCUMENTS

| 2006/0082089 A1* | 4/2006 | Rejtano | A63B 22/18 280/87.042 |
| 2009/0108554 A1* | 4/2009 | Boyle | A63C 17/01 280/87.042 |

* cited by examiner

*Primary Examiner* — Bryan A Evans
(74) *Attorney, Agent, or Firm* — Keeley DeAngelo LLP; W Scott Keeley

(57) ABSTRACT

The present disclosure relates to longboard-skateboards and longboard-skateboard conversion kits, and methods for converting a snowboard to a skateboard. A skateboard of exceptionally long length combining properties of a snowboard and a skateboard with additional support provides a unique ride. A longboard-skateboard conversion kit includes: a board from either a new or reclaimed source, skateboard truck assemblies, one or more support structure (s) made of one or more of various firm but flexible materials whose properties allow the support structure to rebound and return to a predetermined state or shape and having the necessary properties to provide added stability to a skateboard deck or snowboard's flexible nature in the form of suspension, thereby controlling the board's shape and deflecting the weight of the user operating the longboard-skateboard, and thereby equalizing the downward force put upon it and reducing unwanted vibrations from normal use on less than perfectly flat terrain.

7 Claims, 3 Drawing Sheets

LONGBOARD-SKATEBOARD AND LONGBOARD-SKATEBOARD CONVERSION KIT

TECHNICAL FIELD

The present disclosure relates to wheeled boards, and more particularly to a structure for configuring a snowboard as a wheeled board.

BACKGROUND

Traditional skateboards typically provide the user with a deck to stand on comprised of a horizontal surface, typically constructed of a wood, laminated wood, injection molded plastic, composite or the like.

Trucks, is a term generally referring to an assembly that supports two wheels on an axel that is pivotally turned, two such assemblies being mounted to the underside of the skateboard deck. Each set of trucks has a baseplate that is fastened to the deck and supports a hanger. An axel runs through the hanger. Bushings reside between the baseplate and hanger. A bolt, known as a kingpin, is pivotally engaged with the baseplate and hanger and retains the bushings. The bushings cushion or damp the pivoting motion of the hanger, providing control in turning the axel and hence the wheels. Tightening or loosening the kingpin adjusts the trucks for greater stability or faster turning, respectively.

Skateboard sizes typically range between 15 cm×57 cm (6"×22.5") for a small size, and 18 cm×79 cm (7.50"×31") for an average size skateboard. These relatively short, narrow skateboards are commonly intended to be portable and may be configured for tricks and stunts or may also be configured for short distance transportation. In general, a single surface constructed of laminated or composite or homogeneous material tends to provide the rider with a rough, stiff ride that is not conducive to long periods of enjoyment.

Longboards are a category of skateboards that measure approximately 25 cm×140 cm (10"×55") and are designed for relatively longer distance riding than the relatively smaller skateboards while trading some of the properties of portability for a smoother ride.

Snowboards are generally constructed of a hardwood core, often poplar or birch, which is sandwiched between multiple layers of fiber reinforced polymer (FRP), also referred to as fiberglass or composite. Desired properties of the core include damping, rebound, strength, flex and a ratio of high strength to low weight. Some snowboards incorporate the use of more exotic materials such as carbon fiber, Kevlar or aluminum honeycomb core-structure. The front, otherwise referred to as the nose of the board, is upturned to help the board glide over uneven snow. The back, otherwise referred to as the tail, of the board is also upturned to enable backwards or switch riding. The side of the board which contacts the ground, otherwise referred to as the base, is made of Polyethylene plastic. Two significant features of a snowboard construction that differ from skateboard-deck construction are that the snowboard is designed for a majority of the board lower-surface to be in contact with the ground when riding; and the snowboard is constructed with considerable attention to properties of damping, rebound, flexibility and strength to weight ratio.

Shape-memory is a term that refers to the property of some plastics that return to their originally manufactured shape. Some classes of nylon, for example, have a high elastic modulus and will return to their originally molded shape after being deformed. Such plastics commonly return to their originally manufactured shape faster when heated to a temperature that is below their melting point.

There remains a need for a category of ride-on boards that is designed for a smooth and stable ride, reducing unwanted vibrations from use on less than perfectly flat terrain with material properties of damping, rebound, flexibility and strength to weight ratio and maintaining these properties while bridging the distance between two sets of trucks.

SUMMARY

A method and apparatus is provided for the conversion of a snowboard into a long skateboard, heretofore referred to as a longboard. The embodiment of the invention is a ride-on board of exceptionally long length combining properties of a snowboard, including of damping, rebound, flexibility and strength to weight ratio, with the function of a skateboard, further having sufficient support to mitigate contact with the ground by the center of the board during flexion, while maintaining the aforementioned properties of a snowboard.

The construction of a snowboard provides a controlled flexibility and responsive tuning that makes for a smooth ride. A snowboard, unmodified, is sufficiently flexible to be uncontrollable, unstable, unpredictable and dangerous when mounted on a pair of skateboard wheels. The present disclosure mitigates the excessive flexibility of an unmodified snowboard, while maintaining flexibility sufficient for a responsive and smooth ride.

In some embodiments a wheeled board includes, a snowboard deck or a deck of substantially similar materials and construction to that of a modern snowboard, and two complete skateboard truck assemblies, in combination with one or more support structure(s). In one embodiment the deck is between 28 cm-30.5 cm wide and between 190 cm-241 cm long (11"-12"×75"-95").

In some embodiments, support structures are constructed of fiber reinforced polymer (FRP), injection molded fiber reinforced thermo-plastic polymer, injection molded thermos-plastic, wood, Kevlar, carbon fiber, aluminum, or a combination of two or more of the aforementioned materials. Support structures are designed to have shape-memory, or in other words, have the property of returning to their originally manufactured shape after being deformed by external forces. These support structures provide sufficient stiffness to a snowboard or snowboard-like deck to prevent excessive flexion. Excessive flexion occurs when a portion of the board, substantially proximal to the center, and between the two sets of trucks, flexes sufficiently to make contact with the surface over which the wheels are rolling, thereby causing damage to the structure and creating a potentially hazardous situation for the rider.

The flexibly of the present disclosure can be tuned, based upon a rider's weight, by the number of support structure rails affixed to the longboard-skateboard, as well as the dimensions of said rails. This customized flexibility results in a more comfortable ride that can be enjoyed for long durations by the rider.

As understood by one skilled in the art, the principles the present disclosure are not restricted to a specific snowboard or longboard-skateboard, and may apply to any size board consisting of any size front, rear, or middle portions.

These and other non-limiting features or characteristics of the present disclosure will be further described below.

BRIEF DESCRIPTION OF THE DRAWINGS

To assist those of skill in the art in making and using the disclosed working fluid generator and associated methods, reference is made to the accompanying figures, wherein.

DETAILED DESCRIPTION OF THE DRAWINGS

Figure 1:
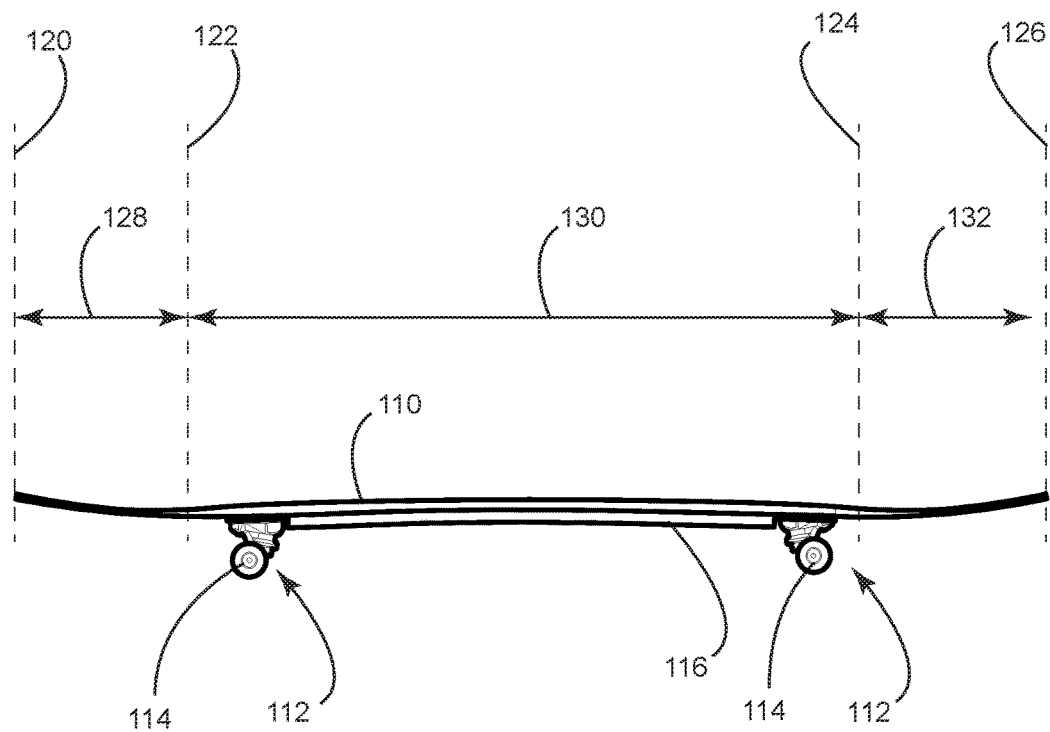
FIG. 1 is an orthographic, side view of an example embodiment using one straight, centered support brace.
Figure 2:
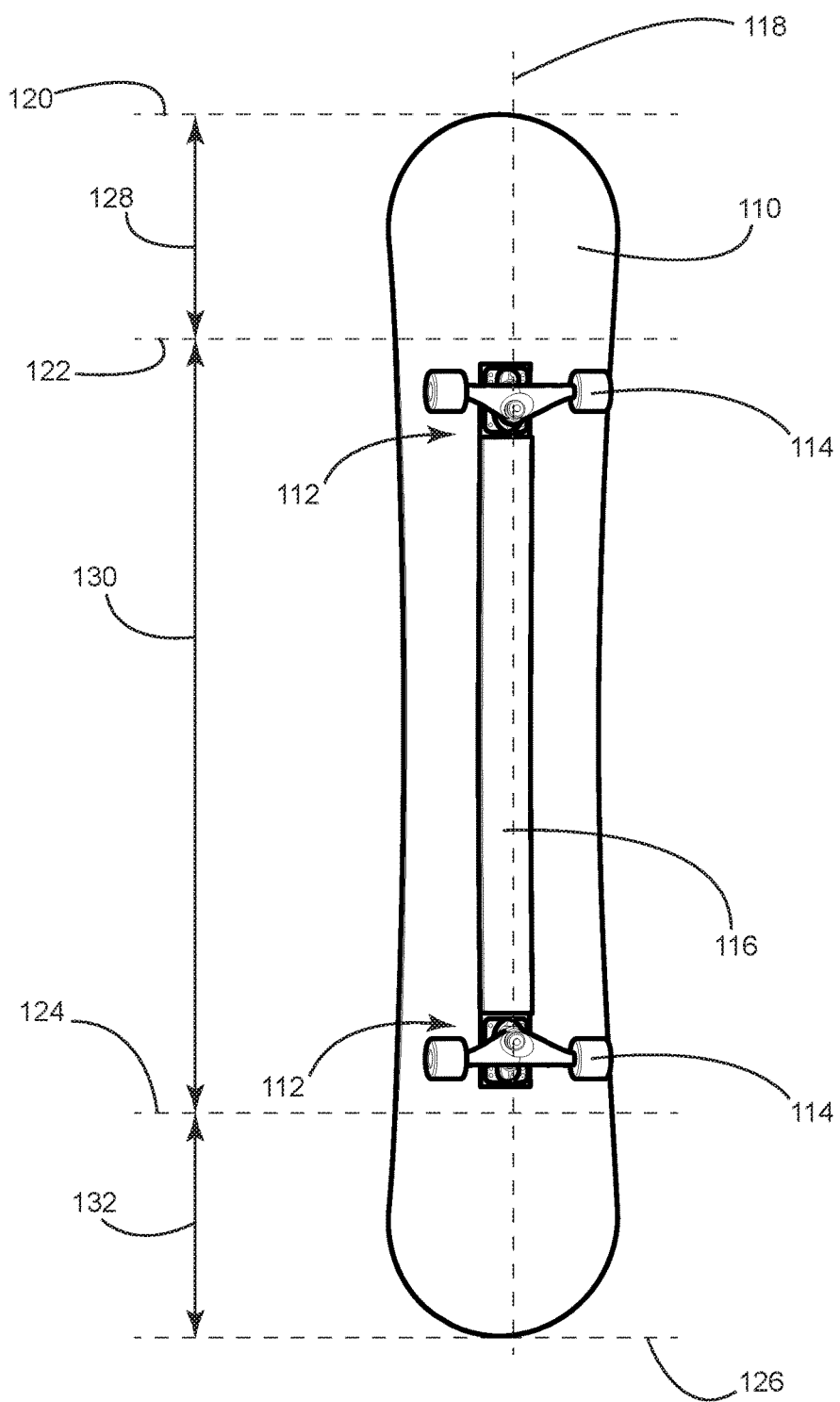
FIG. 2 is a perspective, bottom view of the example embodiment of FIG. 5.

Referring to FIG. 1 and FIG. 2, a longboard-skateboard 110 is fitted with a two sets of trucks 112, supporting wheels 114, and a single straight support brace 116 having midsections positioned substantially proximal to the longboard-skateboard centerline 118. The longboard-skateboard is comprised of a middle section 130, a front section 128 that is further comprised of a curve beginning substantially proximal to section line 122 and ending substantially proximal to section line 120, and a back section 132 that is further comprised of a curve beginning at point 124 and ending substantially proximal to section line 126.

Figure 3:
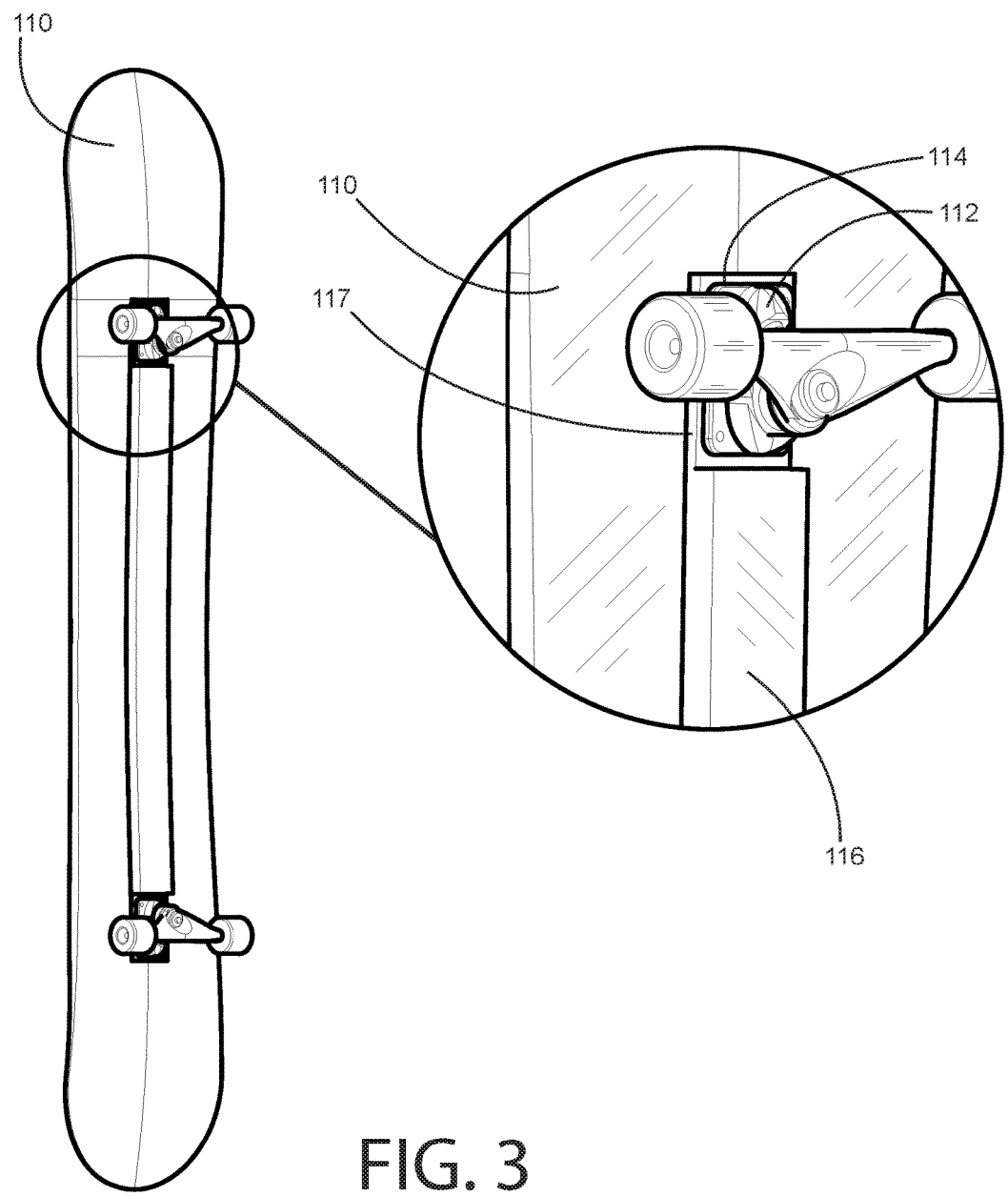
FIG. 3 is a perspective, detail view of the embodiment wheel assembly.

Referring to FIG. 3, a longboard-skateboard 110 is fitted with two sets of trucks 114, supporting wheels 112 mounted on a wheel mount 114 that is part of the straight support brace 116.

The present disclosure has been described with reference to example embodiments. Modifications and alterations will occur to others upon reading and understanding the preceding detailed description. It is intended that the present disclosure be construed as including all such modifications and alterations insofar as they come within the scope of the appended claims or the equivalents thereof.

Although the systems and methods of the present disclosure have been described with reference to example embodiments thereof, the present disclosure is not limited to such example embodiments and or implementations. Rather, the systems and methods of the present disclosure are susceptible to many implementations and applications, as will be readily apparent to persons skilled in the art from the disclosure hereof. The present disclosure expressly encompasses such modifications, enhancements and or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A structural support member for a conventional snowboard for converting the conventional snowboard to a longboard-skateboard comprising:
   providing a conventional snowboard having a substantially flat deck; and
   said deck having a length to width ratio of 6.15 to 1; and
   said deck having a deck long-axis; and
   said deck comprising an upper surface and a substantially flat lower surface; and
   said deck further comprising a front portion, a rear portion and a middle portion; and
   a single substantially linear structural member, comprising:
      a length to width ratio of 14 to 1; and
      a structural-member long-axis; and
      a first end and a second end at each end of said long axis; and
      both first and second end being between 0.375 and 0.75 of the thickness of the majority of the substantially linear member; and
   said substantially linear member fixedly engaged with said deck substantially flat lower surface with said deck long-axis collinear with said structural-member long-axis; and
   providing a first skateboard truck assembly and a second skateboard truck assembly; and
   said first truck assembly mounted on said deck substantially flat lower surface, proximal to said deck front portion; and
   said second truck assembly mounted on said deck substantially flat lower surface, proximal to said deck rear portion; and
   a conventional snowboard is converted to a skateboard as said substantially linear member provides sufficient structure to prevent excessive flexion of the deck such that the lower portion of the deck does not contact a surface over which the truck assemblies are in contact with; and wherein said substantially linear member returns to its original shape after being flexed.

2. The structural support member of claim 1 further comprising;
   fiber reinforced, thermoset, composite material.

3. The structural support member of claim 1 further comprising;
   injection-molded carbon-fiber reinforced nylon.

4. A kit for converting a conventional snowboard deck to a skateboard comprising:
   providing a conventional snowboard deck having an upper surface and a substantially flat lower surface; and
   a first skateboard truck assembly; and
   a second skateboard truck assembly; and
   a substantially linear structural-member, comprising:
      a length to width ratio of 14 to 1; and
      a structural-member long-axis; and
      a first end and a second end at each end of said long axis; and
      both first and second end being between 0.375 and 0.75 of the thickness of the majority of the substantially linear structural-member; wherein
   the first and second skateboard truck assembly are fixedly engaged the first end and second end of the substantially linear structural-member and the substantially linear structural-member is fixedly engaged to the conventional snowboard deck substantially flat lower surface.

5. The kit for converting a conventional snowboard deck to a skateboard of claim 4 further comprising:
   carbon fiber torsion rods embedded in said substantially linear structural-member.

6. The kit for converting a conventional snowboard deck to a skateboard of claim 4 wherein:
   the substantially linear structural-member is comprised of injection-molded carbon fiber reinforced nylon.

7. The kit for converting a conventional snowboard deck to a skateboard of claim 4 wherein:
   the substantially linear structural-member is comprised of fiber reinforced thermoset composite.

* * * * *